US012686181B2

(12) United States Patent
Morrissey et al.

(10) Patent No.: US 12,686,181 B2
(45) Date of Patent: Jul. 21, 2026

(54) INDUCTION WELDING OF COMPOSITE STRUCTURES

(71) Applicant: The Boeing Company, Arlington, VA (US)

(72) Inventors: Emma Louise Morrissey, Saint Louis, MO (US); Ying Shi, Saint Louis, MO (US); Francis J. Samalot, Santa Clarita, CA (US); Gregory J. Hickman, Charleston, SC (US)

(73) Assignee: The Boeing Company, Arlington, VA (US)

( * ) Notice: Subject to any disclaimer, the term of this patent is extended or adjusted under 35 U.S.C. 154(b) by 242 days.

(21) Appl. No.: 18/464,862

(22) Filed: Sep. 11, 2023

(65) Prior Publication Data

US 2025/0083397 A1 Mar. 13, 2025

(51) Int. Cl.
| | |
|---|---|
| *B29C 65/00* | (2006.01) |
| *B29C 65/36* | (2006.01) |
| *B29L 31/30* | (2006.01) |
| *D03D 1/00* | (2006.01) |
| *D03D 15/533* | (2021.01) |
| *D06M 10/02* | (2006.01) |
| *D06M 10/06* | (2006.01) |
| *D06M 11/74* | (2006.01) |
| *D06M 23/06* | (2006.01) |

(52) U.S. Cl.
CPC ........ *B29C 66/7292* (2013.01); *B29C 65/364* (2013.01); *B29C 65/366* (2013.01); *B29C 65/3696* (2013.01); *B29C 66/73141* (2013.01); *D03D 1/00* (2013.01); *D03D 15/533* (2021.01); *D06M 10/025* (2013.01); *D06M 10/06* (2013.01); *D06M 11/74* (2013.01);

*D06M 23/06* (2013.01); *B29L 2031/3076* (2013.01); *D06M 2200/00* (2013.01); *D10B 2505/12* (2013.01)

(58) Field of Classification Search
CPC . B29C 66/7292; B29C 65/364; B29C 65/366; B29C 65/3696; B29C 66/73141; B29C 65/3636; B29C 65/3684; B29C 66/1122; B29C 66/472; B29C 66/7212; B29C 66/72141; B29C 66/73921; B29C 65/36; D03D 1/00; D03D 15/533; D06M 10/025; D06M 10/06; D06M 11/74; D06M 23/06; D06M 2200/00; B29L 2031/3076; D10B 2505/12; B29K 2307/04
See application file for complete search history.

(56) References Cited

U.S. PATENT DOCUMENTS

2019/0358909 A1 11/2019 Murillo et al.

FOREIGN PATENT DOCUMENTS

JP H03248832 A * 11/1991

OTHER PUBLICATIONS

Extended European Search Report, dated Oct. 21, 2024, regarding EP Application No. 24182564.5, 10 pages.

(Continued)

*Primary Examiner* — S. Behrooz Ghorishi
(74) *Attorney, Agent, or Firm* — Yee & Associates, P.C.

(57) ABSTRACT

A composite structure and methods of forming composite structures are provided. A composite structure comprises a first composite part; a second composite part welded to the first composite part at a joint; and the joint between the first composite part and the second composite part comprising doped fibers.

21 Claims, 6 Drawing Sheets

(56) References Cited

OTHER PUBLICATIONS

Gardiner, "Thermoplastic composites welding advances for more sustainable airframes," CompositesWorld, Sep. 28, 2022, 25 pages, CompositesWorld Media, accessed Sep. 11, 2023, https://www.compositesworld.com/articles/plant-tour-qarbon-aerospace-milledgeville-ga-and-red-oak-texas.

Grouve, et al., "Induction heating of UD C/PEKK cross-ply laminates," ScienceDirect, Procedia Manufacturing, 2020, pp. 29-35, vol. 47, Elsevier Ltd., accessed Sep. 11, 2023, https://www.sciencedirect.com/science/article/pii/S1359835X23000398.

Imetrumlimited, "Automatic measurement of crack length on composite DCB specimen," YouTube, accessed Sep. 11, 2023, https://www.youtube.com/watch?v=UPM_i9UtHro.

Sha et al., "Synergistically enhancing the electrical conductivity of carbon fibre reinforced polymers by vertical graphene and silver nanowires," ScienceDirect, May 2023, pp. 1-23, vol. 168, Elsevier Ltd., accessed Sep. 11, 2023, https://www.sciencedirect.com/science/article/pii/S1359835X23000398.

Ahmed et al., "Induction welding of thermoplastic composites—an overview," Composites Part A: Applied Science and Manufacturing, vol. 37, Issue 10, Oct. 2006, pp. 1638-1651, https://www.sciencedirect.com/science/article/abs/pii/S1359835X05003957.

* cited by examiner

600

602 — SPECIFICATION AND DESIGN

604 — MATERIAL PROCUREMENT

606 — COMPONENT AND SUBASSEMBLY MANUFACTURING

608 — SYSTEM INTEGRATION

610 — CERTIFICATION AND DELIVERY

612 — IN SERVICE

614 — MAINTENANCE AND SERVICE

700

AIRCRAFT

702 — AIRFRAME        INTERIOR — 706

SYSTEMS

PROPULSION SYSTEM        ELECTRICAL SYSTEM 708        712        710        714

HYDRAULIC SYSTEM        ENVIRONMENTAL SYSTEM

704

INDUCTION WELDING OF COMPOSITE STRUCTURES

BACKGROUND INFORMATION

1. Field

The present disclosure relates generally to composite manufacturing and more specifically to induction welding of composite structures.

2. Background

Thermoplastic polymer composites are suitable for structural aircraft applications due to their mechanical performance capabilities. Thermoplastic polymer composites are able to be processed quickly and to be re-melted and re-formed. The ability to re-melt and re-form enables induction welding. Induction welding is a process through which composite structures can be joined together without the use of chemical adhesive bonding or mechanical fasteners. induction welding can be performed without external heaters making direct contact with the structure.

In induction welding, alternating current is induced in the carbon fibers, which melts the surrounding polymer. Two thermoplastic structures can be joined together by melting and re-crystallizing them together.

Induction welding can be difficult to control due to a need for specific fiber contacts in order to induce currents in the structures. Induction welding can be difficult to control because induced currents can melt the whole structure, leading to deconsolidation and poor surface quality without precise tooling.

Therefore, it would be desirable to have a method and apparatus that takes into account at least some of the issues discussed above, as well as other possible issues.

SUMMARY

An embodiment of the present disclosure provides a composite structure. The composite structure comprises a first composite part, a second composite part welded to the first composite part at a joint, and the joint between the first composite part and the second composite part comprising doped fibers.

Another embodiment of the present disclosure provides a method of welding two composite parts to form a composite structure. A first composite part is formed with a doped prepreg ply comprising doped fibers at a first surface of the first composite part. A second composite part is positioned in contact with the first surface such that the doped prepreg ply is positioned at a joint between the first composite part and the second composite part. The first composite part and the second composite part are welded at the joint using heat generated by the doped fibers in response to an electromagnetic field.

Yet another embodiment of the present disclosure provides a method. Fibers are doped to form doped fibers with increased conductivity. A doped prepreg ply is formed comprising the doped fibers. The doped prepreg ply is applied to a first composite part. A second composite part is positioned relative to the composite part such that the doped prepreg ply is positioned between the second composite part and the first composite part.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account several considerations. The illustrative examples recognize and take into account that some challenges of induction welding could be overcome by isolating the current generation to only the surface of the structures to be joined, at the joint interface.

The illustrative examples isolate the current generation at the joint interface by using at least one surface ply with functionalized fibers and increased conductivity.

The fibers can be functionalized using Plasma Enhanced Chemical Vapor Deposition (PECVD) which causes vertical graphene to grow from the existing fibers, increasing the conductivity of the fibers. The increased conductivity increases the current which can be induced in the fibers at the joint interface, which increases the heat energy that can be generated there by a theoretical power of two.

Figure 1:
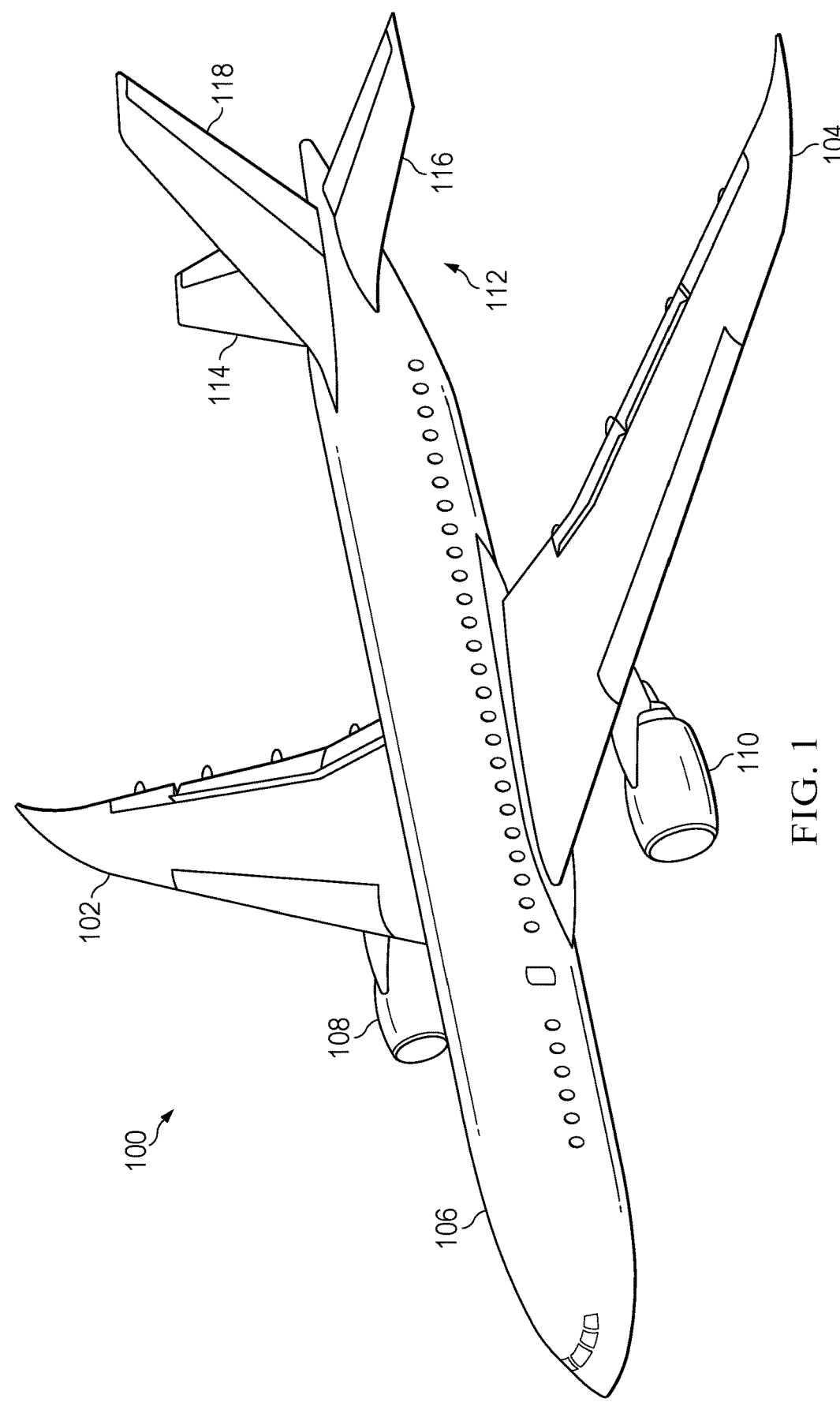
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have a composite structure induction welded using the illustrative examples. In some illustrative examples, an induction welded composite structure can be present in at least one of wing 102, wing 104, or body 106 of aircraft 100.

Figure 2:
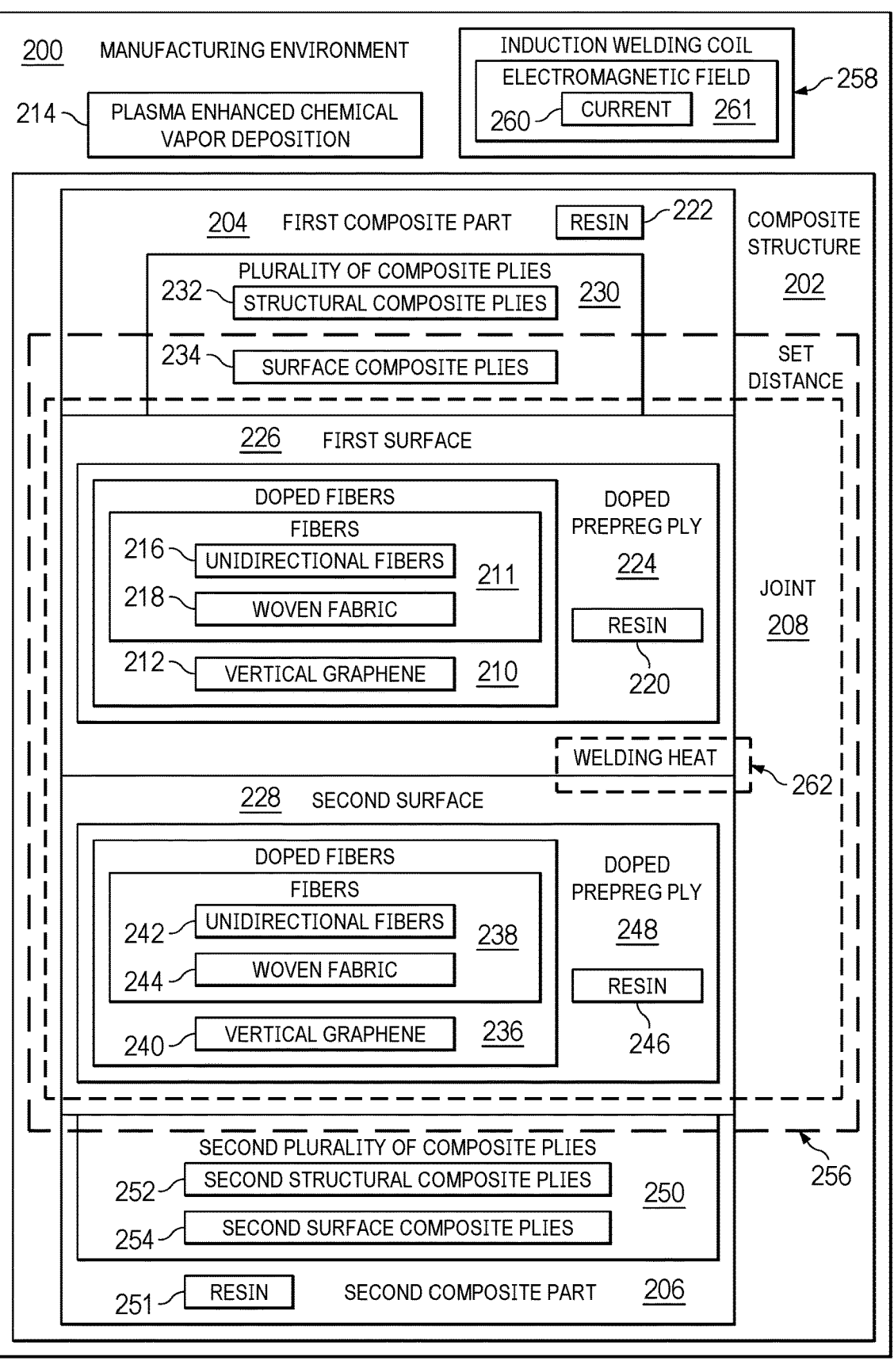
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Composite structure 202 can be induction welded in manufacturing environment 200. Composite structure 202 can be a composite component of aircraft 100.

Composite structure 202 comprises first composite part 204, second composite part 206 welded to first composite part 204 at joint 208, and joint 208 between first composite part 204 and second composite part 206 comprising doped fibers 210.

In some illustrative examples, doped fibers 210 comprise fibers 211 doped with vertical graphene 212. In some illustrative examples, fibers 211 comprise carbon-based fibers. Vertical graphene 212 can be deposited on fibers 211 using plasma enhanced chemical vapor deposition 214.

In some illustrative examples, doped fibers 210 comprise unidirectional fibers 216. In some illustrative examples, doped fibers 210 comprise woven fabric 218. After forming vertical graphene 212 on fibers 211, resin 220 is applied to fibers 211 to form doped prepreg ply 224. In some illustrative examples, resin 220 present in joint 208 is the same as resin 222 present in first composite part 204. In some illustrative examples, resin 220 present in doped prepreg ply 224 does not include conductive metal additives.

After applying resin 220 to doped fibers 210, doped prepreg ply 224 can be applied to one of first composite part 204 or second composite part 206. As depicted, doped prepreg ply 224 is a part of first composite part 204. In other illustrative examples, doped prepreg ply 224 is not present in first composite part 204. In some illustrative example, doped prepreg ply 224 is present in second composite part 206.

When present in first composite part 204, doped prepreg ply 224 forms first surface 226. First surface 226 of first composite part 204 is in contact with second surface 228 of second composite part 206 in joint 208.

First composite part 204 is formed of plurality of composite plies 230. Plurality of composite plies 230 are formed of fibers and resin 222. Plurality of composite plies 230 comprises structural composite plies 232. Structural composite plies 232 are present in first composite part 204 to contribute to material and structural characteristics of first composite part 204. Structural composite plies 232 are part of a design for first composite part 204.

Plurality of composite plies 230 comprises surface composite plies 234 forming first surface 226. Surface composite plies 234 are not present to meet design specifications for strength or other characteristics of first composite part 204.

In some illustrative examples, doped prepreg ply 224 is one of surface composite plies 234. In some illustrative examples, doped prepreg ply 224 is applied after structural composite plies 232 sufficient to meet structural characteristics for first composite part 204.

In some illustrative examples, doped prepreg ply 224 is one of structural composite plies 232. In these illustrative examples, doped prepreg ply 224 is manufactured according to a manufacturing method for the respective structural ply after doping using plasma enhanced chemical vapor deposition 214.

As depicted, doped fibers 236 are also present at joint 208. In some illustrative examples, doped fibers 236 comprise fibers 238 doped with vertical graphene 240. Vertical graphene 240 can be deposited on fibers 238 using plasma enhanced chemical vapor deposition 214.

In some illustrative examples, doped fibers 236 comprise unidirectional fibers 242. In some illustrative examples, doped fibers 236 comprise woven fabric 244. After forming vertical graphene 240 on fibers 238, resin 246 is applied to fibers 238 to form doped prepreg ply 248. In some illustrative examples, resin 246 present in joint 208 is the same as resin 251 present in second composite part 206. In some illustrative examples, resin 246 present in doped prepreg ply 248 does not include conductive metal additives.

Second composite part 206 is formed of second plurality of composite plies 250. Second plurality of composite plies 250 is formed of fibers and resin 251. Second plurality of composite plies 250 comprises second structural composite plies 252. Second structural composite plies 252 are present in second composite part 206 to contribute to material and structural characteristics of second composite part 206. Second structural composite plies 252 are part of a design for second composite part 206.

Second plurality of composite plies 250 comprises second surface composite plies 254 forming second surface 228. Second surface composite plies 254 are not present to meet design specifications for strength or other characteristics of second composite part 206.

In some illustrative examples, doped prepreg ply 248 is one of second surface composite plies 254. In some illustrative examples, doped prepreg ply 248 is applied after second structural composite plies 252 sufficient to meet structural characteristics for second composite part 206.

In some illustrative examples, doped prepreg ply 248 is one of second structural composite plies 252. In these illustrative examples, doped prepreg ply 248 is manufactured according to a manufacturing method for the respective structural ply after doping using plasma enhanced chemical vapor deposition 214.

As depicted, doped prepreg ply 224 forms first surface 226 of first composite part 204. As depicted, doped prepreg ply 248 forms second surface 228 of second composite part 206. Doped prepreg ply 224 and doped prepreg ply 248 are present in joint 208.

In some illustrative examples, doped fibers 210 are isolated within joint 208.

In some illustrative examples, doped fibers 210 are part of a structural ply of one of first composite part 204 or second composite part 206. In some illustrative examples, doped fibers 210 are part of an additional ply present for joining first composite part 204 and second composite part 206 independently of a structural design for first composite part 204 and a second structural design for second composite part 206.

Doped fibers 210 in doped prepreg ply 224 are more conductive than conventional prepreg plies. The increase in conductivity can increase heat generation in doped prepreg ply 224. By locating doped prepreg ply 224 in joint 208, heat during induction welding can be located within joint 208.

Doped fibers in joint 208, such as doped fibers 210 or doped fibers 236, enable induction welding without undesirable effects to resulting composite structure 202. Doped fibers in joint 208 enable induction welding without component deconsolidation and without reduced surface quality, without the need for high precision tooling.

Doped fibers 210 isolate welding heat 262 to plies within set distance 256 from doped fibers 210 by increased heat generation of doped fibers 210. Doped fibers 236 isolate welding heat 262 to plies within set distance 256 from doped fibers 236 by increased heat generation of doped fibers 236. By applying doped fibers 210 and doped fibers 236 only within joint 208, welding heat 262 is isolated at or near joint 208.

Increased heat generation of doped fibers 210 and doped fibers 236 enables induction welding coil 258 to operate at current 260. Current 260 is a lower operating current than conventional induction welding. By utilizing a reduced current, current 260, induction welding coil 258 reduces or eliminates heat generation in the remainder of first composite part 204 and second composite part 206.

Joint 208 is formed between first composite part 204 and second composite part 206 by welding heat 262 generated in response to electromagnetic field 261 generated by induction welding coil 258. Induction welding coil 258 generates electromagnetic field 261 having current 260. At least one of doped fibers 210 or doped fibers 236 are present in joint 208 and generate welding heat 262 in response to electromagnetic field 261.

By using at least one of doped prepreg ply 224 with doped fibers 210 or doped prepreg ply 248 with doped fibers 236 to heat joint 208, first composite part 204 and second composite part 206 can be processed in a conventional way, and then joined together without additional materials or joining assistance. Plasma enhanced chemical vapor deposition 214 process to dope fibers 211 and the pre-impregnation of doped fibers 210 results in doped prepreg ply 224 with increased conductivity without any changes to the part design, joint 208 interface, or processing methods.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, more than one doped ply can be present in at least one of first composite part 204 or second composite part 206. As another example, only one of doped prepreg ply 224 or doped prepreg ply 248 can be present in composite structure 202. Although resin 222 and resin 251 are discussed separately, resin 222 can be the same as resin 251. In some illustrative examples, resin 222, resin 251, resin 220, and resin 246 can be the same.

In some illustrative examples, doped fibers 210 and doped fibers 236 are the same. In some illustrative examples, doped fibers 210 and doped fibers 236 are unidirectional fibers 216 and unidirectional fibers 242. In some illustrative examples, doped fibers 210 and doped fibers 236 are woven fabric 218 and woven fabric 244.

Figure 3:
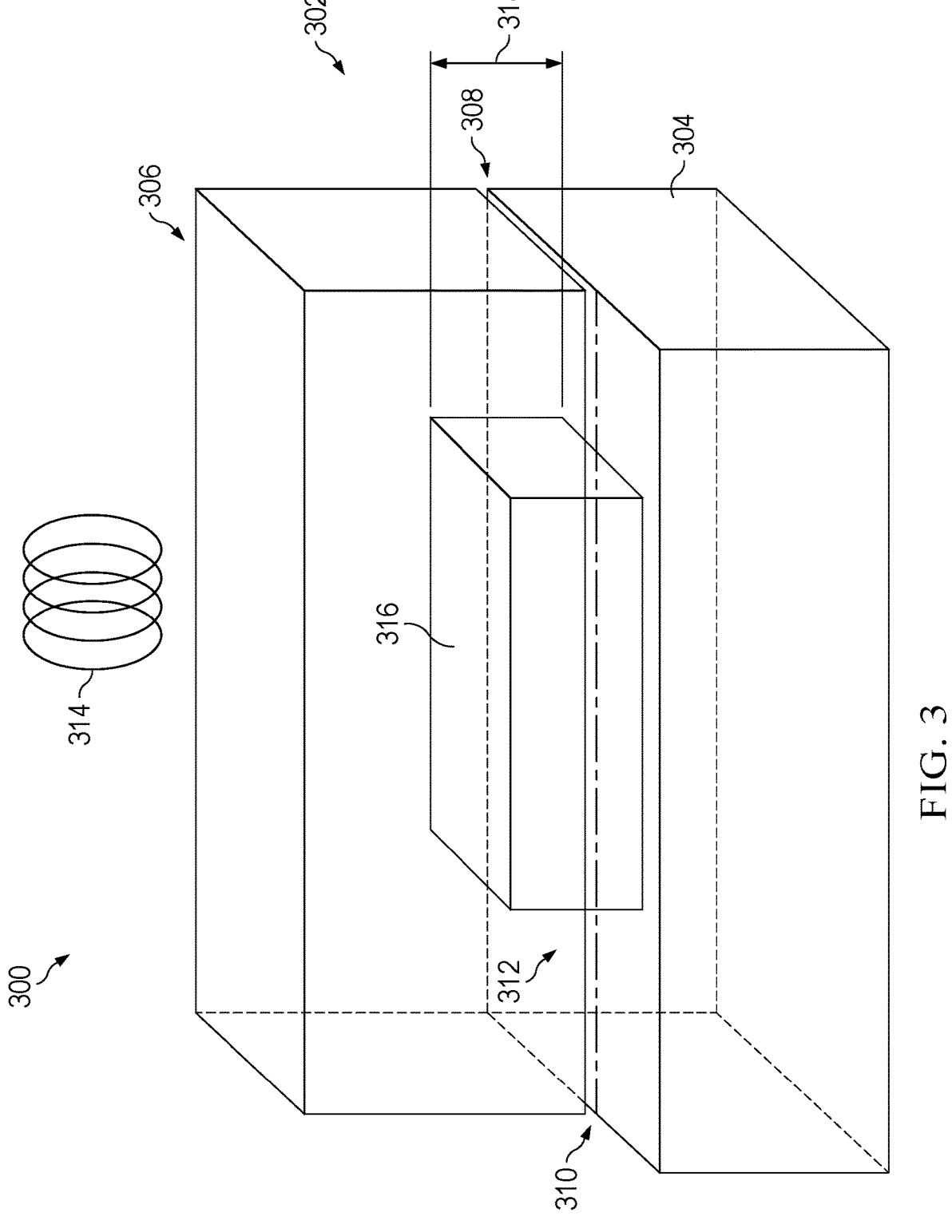
FIG. 3 is an illustration of an isometric view of induction welding a composite structure with a doped ply at the joint in accordance with an illustrative embodiment.

Turning now to FIG. 3, an illustration of an isometric view of induction welding a composite structure with a doped ply at the joint is depicted in accordance with an illustrative embodiment. Composite structure 302 in view 300 is a physical implementation of composite structure 202 of FIG. 2.

Composite structure 302 comprises first composite part 304, second composite part 306, and joint 308 between first composite part 304 and second composite part 306. Joint 308 comprises doped fibers.

As depicted, first composite part 304 comprises first surface 310. First surface 310 comprises doped prepreg ply 312. Doped prepreg ply 312 comprises the doped fibers.

Doped prepreg ply 312 is in contact with second composite part 306. In some illustrative examples, second composite part 306 comprises a doped composite ply in place of or in addition to doped prepreg ply 312 of first composite part 304.

To inductively weld first composite part 304 to second composite part 306, inductive welding coil 314 is positioned relative to first composite part 304 and second composite part 306. Inductive welding coil 314 can have a reduced current in welding first composite part 304 and second composite part 306 due to doped fibers in doped prepreg ply 312.

Due to a reduced current of inductive welding coil 314, heat affected zone 316 of first composite part 304 and second composite part 306 is reduced. Doped prepreg ply 312 isolates welding heat to plies within set distance 318 from the doped fibers by increased heat generation of the doped fibers.

Figure 4:
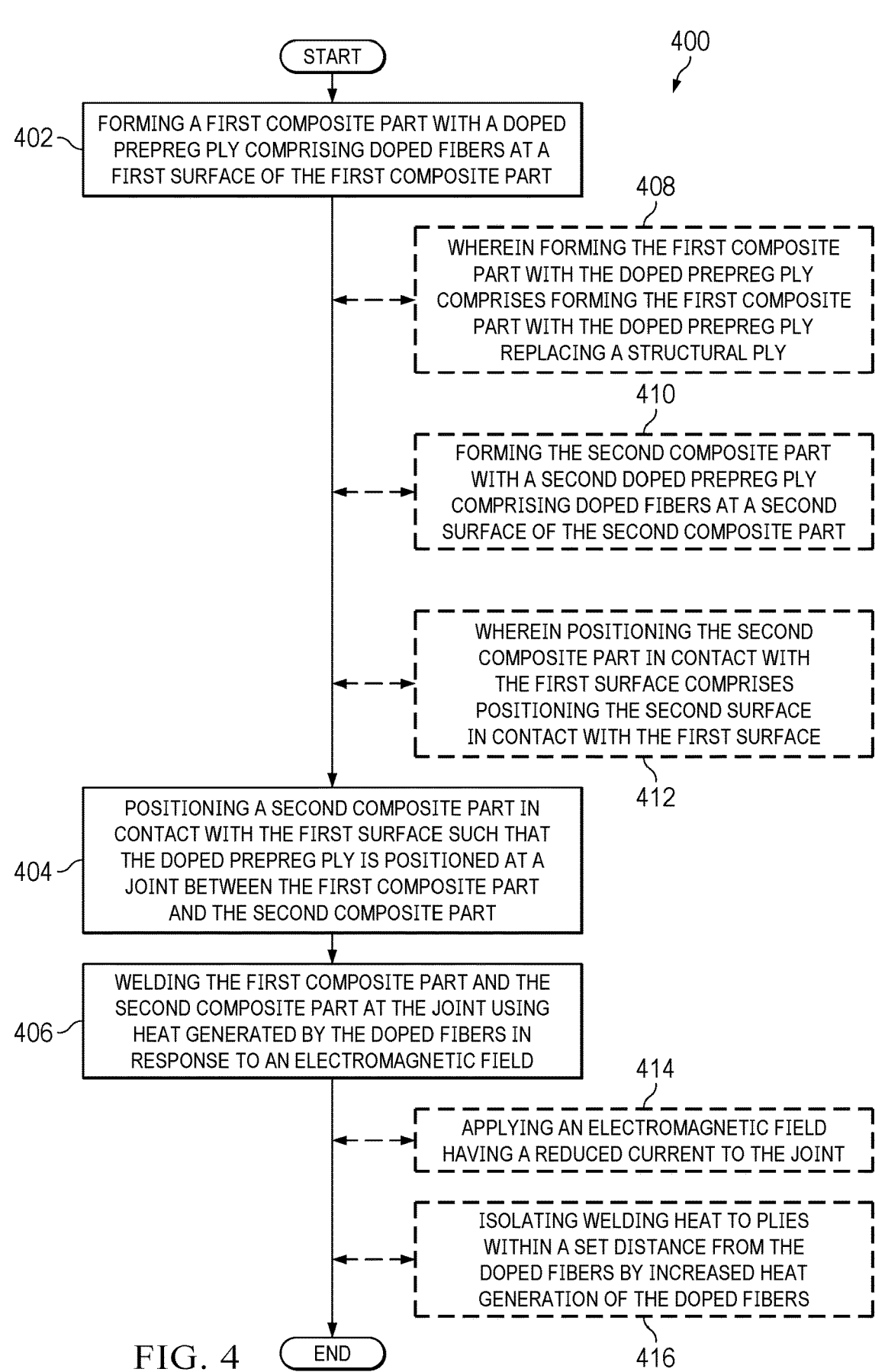
FIG. 4 is a flowchart of a method of welding two composite parts to form a composite structure in accordance with an illustrative embodiment.

Turning now to FIG. 4, a flowchart of a method of welding two composite parts to form a composite structure is depicted in accordance with an illustrative embodiment. Method 400 can be used to weld together first composite part 204 and second composite part 206 of FIG. 2. Method 400 can be used to weld together first composite part 304 and second composite part 306 of FIG. 3.

A first composite part is formed with a doped prepreg ply comprising doped fibers at a first surface of the first composite part (operation 402). A second composite part is positioned in contact with the first surface such that the doped prepreg ply is positioned at a joint between the first composite part and the second composite part (operation 404). The first composite part and the second composite part are welded at the joint using heat generated by the doped fibers in response to an electromagnetic field (operation 406). Afterwards, method 400 terminates.

In some illustrative examples, method 400 applies an electromagnetic field having a reduced current to the joint (operation 414). The reduced current induces heat generation in the doped fibers. The reduced current does not generate undesirable amounts of heat in non-doped fibers.

In some illustrative examples, forming the first composite part with the doped prepreg ply comprises forming the first composite part with the doped prepreg ply replacing a structural ply (operation 408). In some illustrative examples, when the doped prepreg ply replaces the structural ply, the doped prepreg ply has the same fiber orientation as the structural ply.

In some illustrative examples, method 400 forms the second composite part with a second doped prepreg ply comprising doped fibers at a second surface of the second composite part (operation 410). In some illustrative examples, positioning the second composite part in contact with the first surface comprises positioning the second surface in contact with the first surface (operation 412).

In some illustrative examples, method 400 isolates welding heat to plies within a set distance from the doped fibers by increased heat generation of the doped fibers (operation 416). Isolating heat to plies within the set distance of the doped fibers limits the heat applied to the first composite part and the second composite part outside of the joint. Isolating heat to plies within the set distance of the doped fibers can result in a higher quality composite structure than conventional induction welding.

Figure 5:
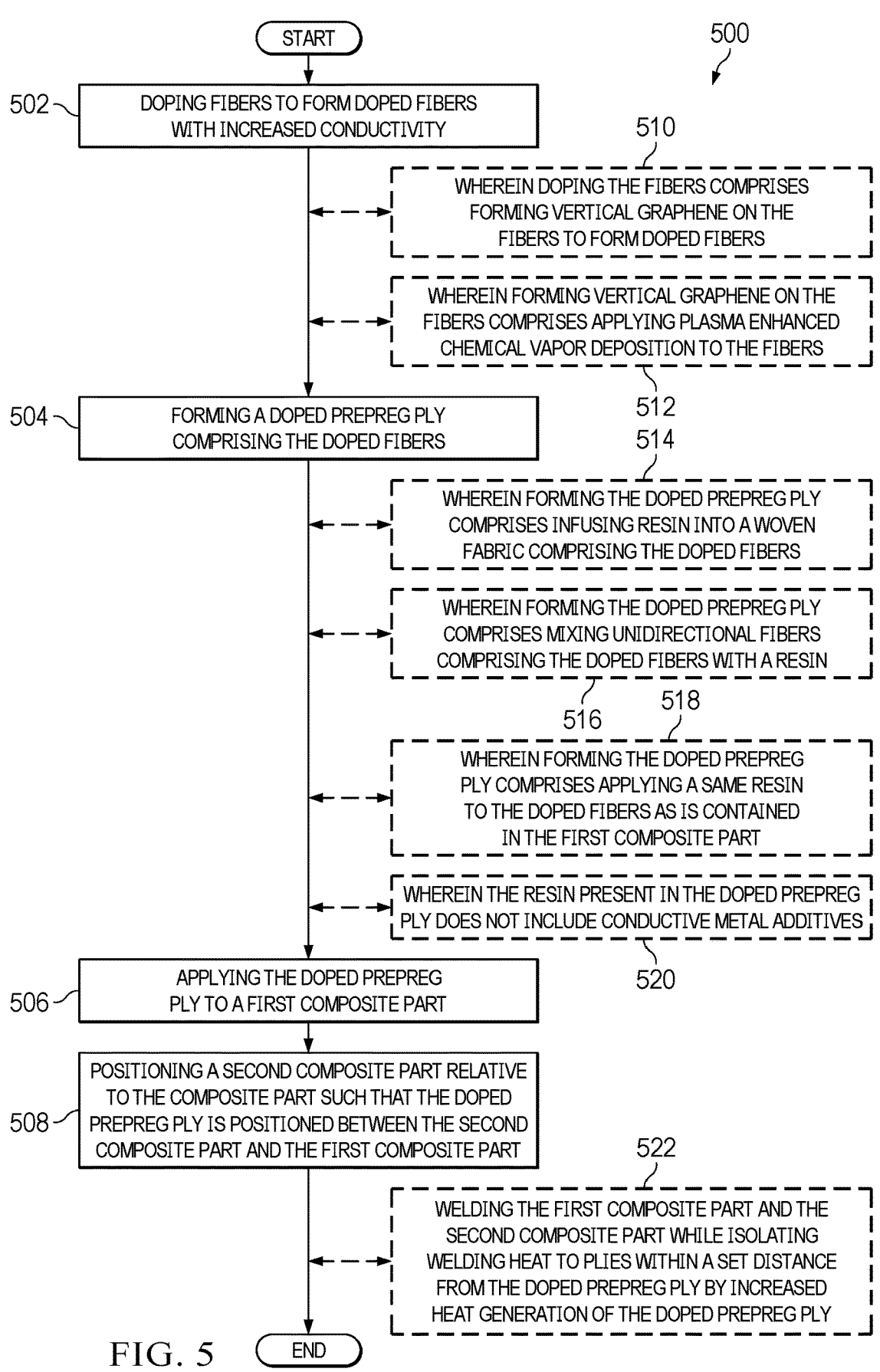
FIG. 5 is a flowchart of a method of placing doped fibers between a first composite part and a second composite part in accordance with an illustrative embodiment.

Turning now to FIG. 5, a flowchart of a method of placing doped fibers between a first composite part and a second composite part is depicted in accordance with an illustrative embodiment. Method 500 can be used to weld together first composite part 204 and second composite part 206 of FIG. 2. Method 500 can be used to weld together first composite part 304 and second composite part 306 of FIG. 3.

Method 500 dopes fibers to form doped fibers with increased conductivity (operation 502). Method 500 forms a doped prepreg ply comprising the doped fibers (operation 504). Method 500 applies the doped prepreg ply to a first composite part (operation 506). Method 500 positions a second composite part relative to the composite part such that the doped prepreg ply is positioned between the second composite part and the first composite part (operation 508). Afterwards, method 500 terminates.

In some illustrative examples, doping the fibers comprises forming vertical graphene on the fibers to form doped fibers (operation 510). In some illustrative examples, forming vertical graphene on the fibers comprises applying plasma enhanced chemical vapor deposition to the fibers (operation 512).

In some illustrative examples, forming the doped prepreg ply comprises infusing resin into a woven fabric comprising the doped fibers (operation 514). In some illustrative examples, forming the doped prepreg ply comprises mixing unidirectional fibers comprising the doped fibers with a resin (operation 516). In some illustrative examples, forming the doped prepreg ply comprises applying a same resin to the doped fibers as is contained in the first composite part (operation 518). In some illustrative examples, the resin present in the doped prepreg ply does not include conductive metal additives (operation 520).

In some illustrative examples, method 500 welds the first composite part and the second composite part while isolating welding heat to plies within a set distance from the doped prepreg ply by increased heat generation of the doped prepreg ply (operation 522). The increased heat generation of the doped fibers in the doped prepreg ply can allow for the induction welding coil to operate at a reduced current.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 408 through operation 416 may be optional. For example, operation 510 through operation 522 may be optional.

Figure 6:
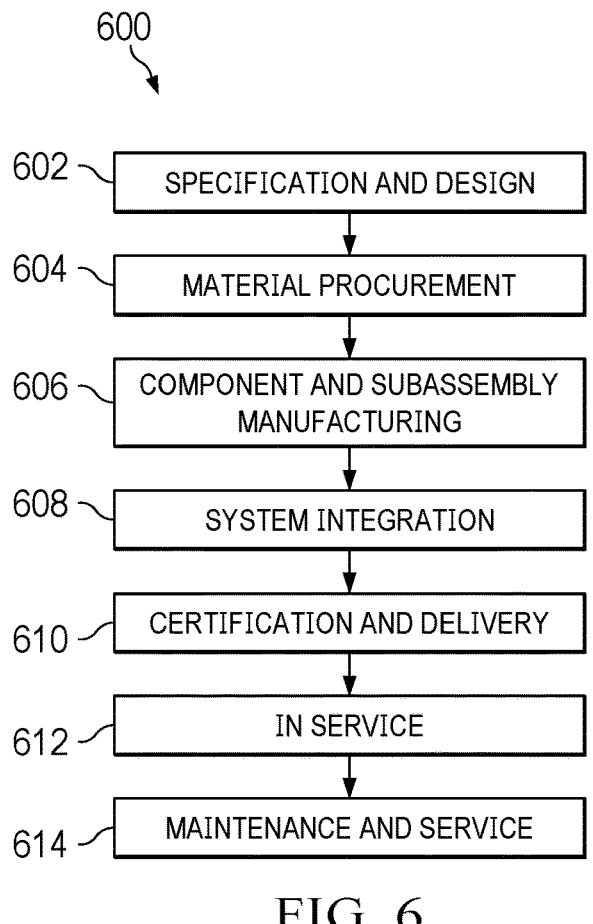
FIG. 6 is an illustration of an aircraft manufacturing and service method in a form of a block diagram in accordance with an illustrative embodiment.
Figure 7:
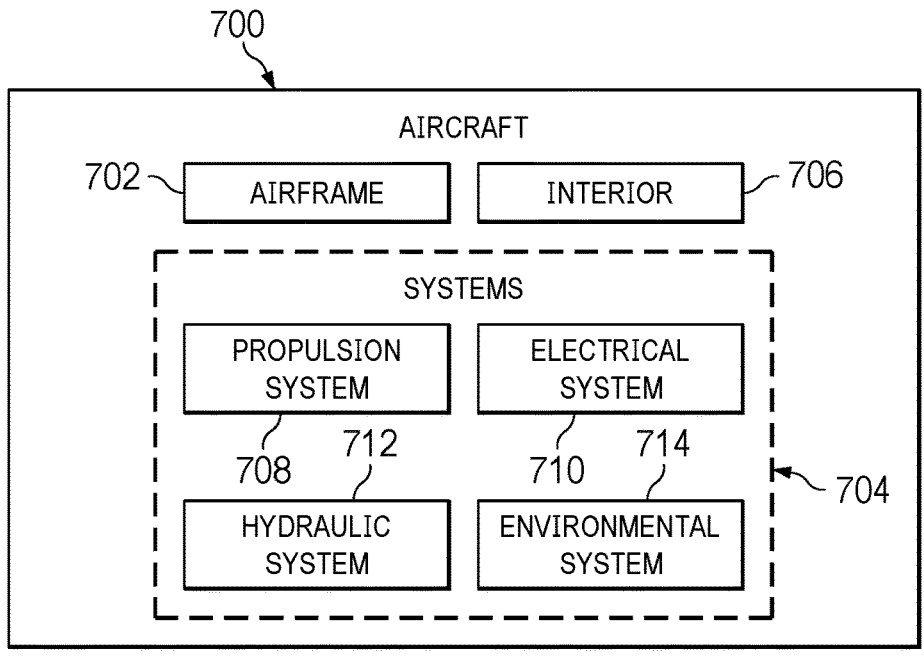
FIG. 7 is an illustration of an aircraft in a form of a block diagram in which an illustrative embodiment may be implemented.

Illustrative embodiments of the present disclosure may be described in the context of aircraft manufacturing and service method 600 as shown in FIG. 6 and aircraft 700 as shown in FIG. 7. Turning first to FIG. 6, an illustration of an aircraft manufacturing and service method in a form of a block diagram is depicted in accordance with an illustrative embodiment. During pre-production, aircraft manufacturing and service method 600 may include specification and design 602 of aircraft 700 in FIG. 7 and material procurement 604.

During production, component and subassembly manufacturing 606 and system integration 608 of aircraft 700 takes place. Thereafter, aircraft 700 may go through certification and delivery 610 in order to be placed in service 612. While in service 612 by a customer, aircraft 700 is scheduled for routine maintenance and service 614, which may include modification, reconfiguration, refurbishment, or other maintenance and service.

Each of the processes of aircraft manufacturing and service method 600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 7, an illustration of an aircraft in a form of a block diagram is depicted in which an illustrative embodiment may be implemented. In this example, aircraft 700 is produced by aircraft manufacturing and service method 600 of FIG. 6 and may include airframe 702 with plurality of systems 704 and interior 706. Examples of systems 704 include one or more of propulsion system 708, electrical system 710, hydraulic system 712, and environmental system 714. Any number of other systems may be included.

Apparatuses and methods embodied herein may be employed during at least one of the stages of aircraft manufacturing and service method 600. One or more illustrative embodiments may be manufactured or used during at least one of component and subassembly manufacturing 606, system integration 608, in service 612, or maintenance and service 614 of FIG. 6.

The illustrative examples enable induction welding without undesirable effects to component quality or surface quality, and without the use of high precision tooling. The illustrative examples provide improved induction welding using doped fibers to increase heat generation locally in the joint between two composite parts.

The illustrative examples comprise fibers doped with vertical graphene. In some illustrative examples, the fibers can take the form of unidirectional carbon fibers. In other illustrative examples, the fibers take the form of woven fibers. The fibers are doped with vertical graphene and pre-impregnated with materials using pre-pregging methods. The doped prepreg ply is then laid up at the faying surface of component laminates. In the illustrative examples, composite parts can be processed in the same way, then joined together without additional materials or joining assistance.

The illustrative examples provide the targeted application of doped fiber pre-pregs at the faying surface of the component laminate. By isolating the doped fiber pre-pregs at the joint the heat generation during induction heating is isolated at the joint interface.

The illustrative examples enable the use of low-melt polymer composite materials with fewer impacts to structure quality. The illustrative examples increase the efficiency of the joining process in terms of energy consumption, processing rate, and requirements for tooling and equipment.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite structure that comprises:
a first composite part that comprises a plurality of thermoplastic plies and a doped prepreg ply that comprises graphene grown on fibers within only a first surface on the first composite part, doped in a resin and configured to generate heat without metallic additives; and
a second composite part that comprises a second plurality of thermoplastic plies and a second doped prepreg ply that comprises a second graphene grown on second fibers within only a second surface on the second composite part, doped in a second resin and configured to generate heat without metallic additives, wherein the second composite part is induction welded to the first composite part where the doped prepreg ply contacts the second doped prepreg ply.

2. The composite structure of claim 1, wherein the resin and the second resin are identical.

3. The composite structure of claim 1, wherein the fibers comprise unidirectional fibers.

4. The composite structure of claim 1, wherein the fibers comprise woven fabric.

5. The composite structure of claim 1, wherein the graphene grown on the fibers is isolated within a joint.

6. The composite structure of claim 1, wherein the resin present in the doped prepreg ply is identical to a resin present in the plurality of thermoplastic plies in the first composite part.

7. The composite structure of claim 1, wherein the fibers are part of a structural ply of one of the first composite part.

8. The composite structure of claim 1, wherein the doped prepreg ply is structured independently of a structural design for the first composite part.

9. A method of welding two composite parts to form a composite structure, the method comprising:
forming a first composite part comprising a plurality of thermoplastic plies and a first surface;
doubling a heat energy generation characteristic of only the first surface by growing vertical graphene from fibers existing in the first surface and then doping the fibers existing in the first surface with a resin and forming the first surface as a doped prepreg ply;
positioning a second composite part in contact with the first surface such that the doped prepreg ply contacts the second composite part; and
generating, from an induction welding coil receiving a current insufficient for welding the first surface before modifying the first surface into the doped prepreg ply, a current forming an electromagnetic field welding the first composite part to the second composite part using heat generated only by the fibers in the doped prepreg ply responding to the electromagnetic field.

10. The method of claim 9, further comprising:
applying the electromagnetic field to the doped prepreg ply at an intensity below an activation intensity for fibers in the second composite part beyond a set distance from the doped prepreg ply.

11. The method of claim 9, wherein forming the first composite part with the doped prepreg ply comprises forming the first composite part with the doped prepreg ply replacing a structural ply.

12. The method of claim 9 further comprising:
forming the second composite part with a second doped prepreg ply comprising doped fibers at a second surface of the second composite part; and
wherein positioning the second composite part in contact with the first surface comprises positioning the second surface in contact with the first surface.

13. The method of claim 9 further comprising:
isolating welding heat to plies within a set distance from the doped prepreg ply.

14. A method comprising:
forming a first composite part comprising a plurality of thermoplastic plies and a first surface;
doubling a heat energy generation characteristic of only the first surface by growing vertical graphene from fibers existing in the first surface and then doping the fibers existing in the first surface with a resin, without metal additives, and;
positioning a second composite part relative to the first composite part such that the doped prepreg ply contacts the second composite part; and
generating, from an induction welding coil receiving a current insufficient for welding the first surface before modifying the first surface into the doped prepreg ply, a current forming an electromagnetic field welding only the first composite part and the second composite part together using heat generated by the doped prepreg ply responding to the electromagnetic field.

15. The method of claim 14, wherein doping the fibers comprises forming vertical graphene on the fibers to form doped fibers.

16. The method of claim 15, wherein forming vertical graphene on the fibers comprises applying plasma enhanced chemical vapor deposition to the fibers.

17. The method of claim 14, wherein forming the doped prepreg ply comprises infusing resin into a woven fabric.

18. The method of claim 14, wherein forming the doped prepreg ply comprises unidirectional fibers.

19. The method of claim 14, wherein the resin forming the doped prepreg ply is identical to resins forming the plurality of thermoplastic plies forming the first composite part.

20. The method of claim 14, wherein resin present in the doped prepreg ply does not include conductive metal additives.

21. The method of claim 14 further comprising:
welding the first composite part and the second composite part while isolating welding heat to plies within a set distance from the doped prepreg ply by increased heat generation of the doped prepreg ply.

* * * * *